United States Patent [19]
Tom

[11] Patent Number: 5,400,349
[45] Date of Patent: Mar. 21, 1995

[54] FAULT TOLERANT COMPARATOR FOR DISK DRIVE CONTROLLERS

[75] Inventor: Ronald H. K. Tom, San Jose, Calif.

[73] Assignee: National Semiconductor Corporation, Santa Clara, Calif.

[21] Appl. No.: 168,856

[22] Filed: Dec. 16, 1993

[51] Int. Cl.[6] .............................................. G06F 11/00
[52] U.S. Cl. .................................... 371/47.1; 371/65; 371/67.1
[58] Field of Search ....................... 371/47.1, 42, 67.1, 371/39.1, 65, 37.1, 2.1, 5.4

[56] References Cited

U.S. PATENT DOCUMENTS

| | | | |
|---|---|---|---|
| 4,413,251 | 11/1983 | Adler et al. | 340/347 DD |
| 5,051,998 | 9/1991 | Murai et al. | 371/39.1 |
| 5,220,568 | 6/1993 | Howe et al. | 371/37.1 |

OTHER PUBLICATIONS

IBM Technical Disclosure Bulletin, "Fault-Tolerant Sync Byte For Run-Length-Limited Codes", vol. 29 No. 1, Jun. 1986, pp. 151–157.

*Primary Examiner*—Vincent P. Canney
*Attorney, Agent, or Firm*—Limbach & Limbach

[57] ABSTRACT

An apparatus and method are disclosed for comparing disk data to a synchronization pattern. A preferred embodiment includes a plurality of exclusive NOR gates for exclusive NORing the disk data with the synchronization pattern to form an exclusive NOR output pattern. A left boundary stage locates a left boundary of an error burst in the exclusive NOR output pattern and generates a left boundary output pattern which indicates the position of the left boundary of the error burst. A multiplexer realigns the exclusive NOR output pattern by a number of bits equal to a maximum allowable error burst width to form a multiplexer output pattern. The exclusive NOR output pattern is realigned such that the least significant bits are shifted in a direction towards the most significant bits. A plurality of OR gates are used for ORing the left boundary output pattern with the multiplexer output pattern to form an OR gate output pattern, and an AND stage is used for ANDing together all of the bits of the OR gate output pattern.

26 Claims, 8 Drawing Sheets

FAULT TOLERANT COMPARATOR FOR DISK DRIVE CONTROLLERS

BACKGROUND OF THE INVENTION

1. Field of the Invention

The present invention relates to disk drive controllers and, more particularly, to a fault tolerant comparator for comparing disk data to a synchronization pattern in order to identify byte boundaries and establish byte synchronization between a disk drive controller and the disk data.

2. Description of the Related Art

FIG. 1 shows the data path for a typical disk drive. Binary information is recorded on the magnetic surface of the disk 20 as magnetic transitions or flux changes. The flux changes, which form a waveform, are arranged according to a data encoding method which must be decoded to produce the binary data. There are many different data encoding methods that can be used to record binary information on a magnetic media. For example, one method is the non-return-to-zero (NRZ) method in which a one and a zero of the binary data can be identified by an up and a down level in the waveform, respectively. The particular data encoding method that is to be used, however, is not critical to the present invention.

A read channel 22 detects the flux changes on the disk 20 and decodes the waveform into the binary data. The read channel 22 transfers the binary data in a serial fashion to a disk data controller 24. A shift register 26 in the disk data controller 24 receives the serial binary data and converts it to parallel form. This part of the disk data controller 24 is often referred to as the serializer/deserializer (serdes) block. The parallel form of the disk data may be virtually any number of bits wide, e.g., eight, sixteen, twenty-four, etc., depending upon the specific type of disk data controller 24. Ultimately, the disk data controller 24 transfers the parallel binary data to a local memory 28 where it can be utilized by a digital system.

One of the main purposes of the disk data controller 24 is to establish synchronization with the beginning of the disk data. Specifically, long sections of data stored on the disk 20 are normally preceded by a preamble and then a synchronization pattern. The preamble is typically a long string of zeros. The synchronization pattern is a unique combination of ones and zeros which is recognized by the disk data controller 24 to indicate the beginning of the disk data. Although the synchronization pattern may be nearly any number of bits wide, it will be assumed herein that the synchronization pattern is sixteen bits wide. As the read channel 22 transfers the disk data to the disk data controller 24, a synchronization stage 30 within the disk data controller 24 compares the incoming disk data to a copy of the synchronization pattern stored in a register 32. When sixteen bits of the incoming disk data matches or is "aligned" with the synchronization pattern 32, a synchronization signal is generated to indicate the beginning of the data.

It is common for there to be errors in the flux changes recorded on the disk 20. Depending upon the specific data encoding method utilized, it is possible for a missing flux or an incorrectly positioned flux to propagate several bits of error in the binary data produced by the read channel 22. Conventional synchronization pattern alignment techniques for disk read operations are not tolerant of any errors occurring in the disk data. Synchronization pattern alignment is only established by an exact match between the disk data and the synchronization pattern. Any errors in the disk data in the synchronization pattern field will prevent synchronization alignment or cause a shifted alignment to occur. Although there is normally some form of error detection and correction for disk data, such protections do not work for errors in the synchronization field because synchronization has not been established. Because the synchronization pattern field has no error protection, an error in the field can result in the loss of an entire sector of data. Such a loss will reduce the storage capacity of the disk drive.

Thus, there is a need for an apparatus and method for comparing disk data to a synchronization pattern that will permit synchronization to be established even though there are errors in the disk data.

SUMMARY OF THE INVENTION

The present invention provides a comparator for comparing disk data to a synchronization pattern. The comparator includes an exclusive OR stage for exclusive ORing the disk data with the synchronization pattern to form an exclusive OR output pattern. A left boundary stage locates a left boundary of an error burst in the exclusive OR output pattern and generates a left boundary output pattern which indicates the position of the left boundary of the error burst. A multiplexer realigns the exclusive OR output pattern by a number of bits equal to a maximum allowable error burst width to form a multiplexer output pattern. The exclusive OR output pattern is realigned such that the least significant bits are shifted in a direction towards the most significant bits. An error detection stage determines if a right boundary of the error burst in the multiplexer output pattern has been realigned such that it is located to the left of the left boundary of the error burst as indicated by the left boundary output pattern.

In another embodiment of the present invention, a comparator for comparing disk data to a synchronization pattern includes a plurality of exclusive NOR gates for exclusive NORing the disk data with the synchronization pattern to form an exclusive NOR output pattern. A left boundary stage locates a left boundary of an error burst in the exclusive NOR output pattern and generates a left boundary output pattern which indicates the position of the left boundary of the error burst. A multiplexer realigns the exclusive NOR output pattern by a number of bits equal to a maximum allowable error burst width to form a multiplexer output pattern. The exclusive NOR output pattern is realigned such that the least significant bits are shifted in a direction towards the most significant bits. A plurality of OR gates are used for ORing the left boundary output pattern with the multiplexer output pattern to form an OR gate output pattern, and an AND stage is used for ANDing together all of the bits of the OR gate output pattern.

The present invention also provides a method of comparing disk data to a synchronization pattern. Pursuant to this method, the disk data is exclusive NORed with the synchronization pattern to form an exclusive NOR output pattern. The left boundary of an error burst in the exclusive NOR output pattern is located and a left boundary output pattern which indicates the position of the left boundary of the error burst is generated. The exclusive NOR output pattern is realigned by a number of bits equal to a maximum allowable error burst width to form a realigned exclusive NOR output pattern. The exclusive NOR output pattern is realigned such that the least significant bits are shifted in a direction towards the most significant bits. The left boundary output pattern is ORed with the realigned exclusive NOR output pattern to form an OR output pattern, and all of the bits of the OR output pattern are ANDed together.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE PREFERRED EMBODIMENT

Figure 1:
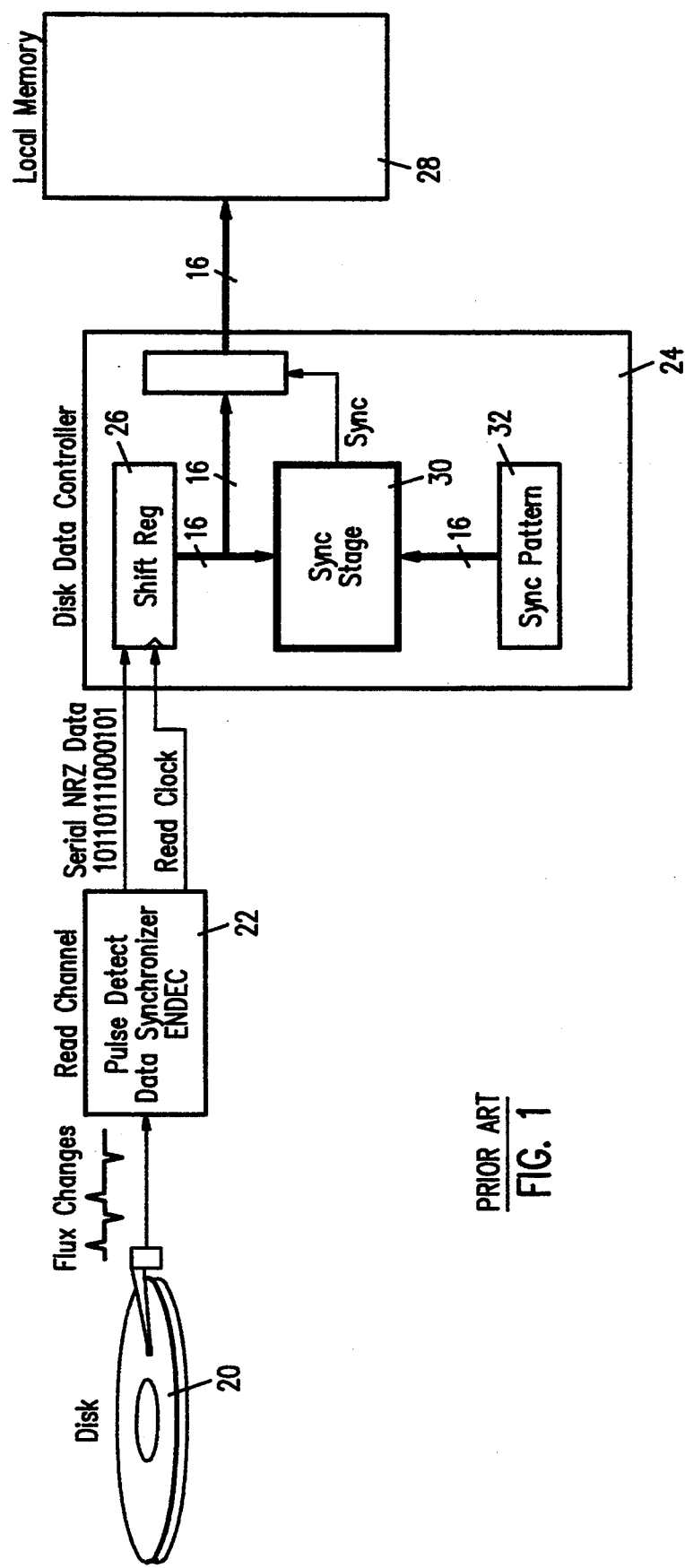
FIG. 1 is a block diagram illustrating the read data path for a conventional disk drive.
Figure 2:
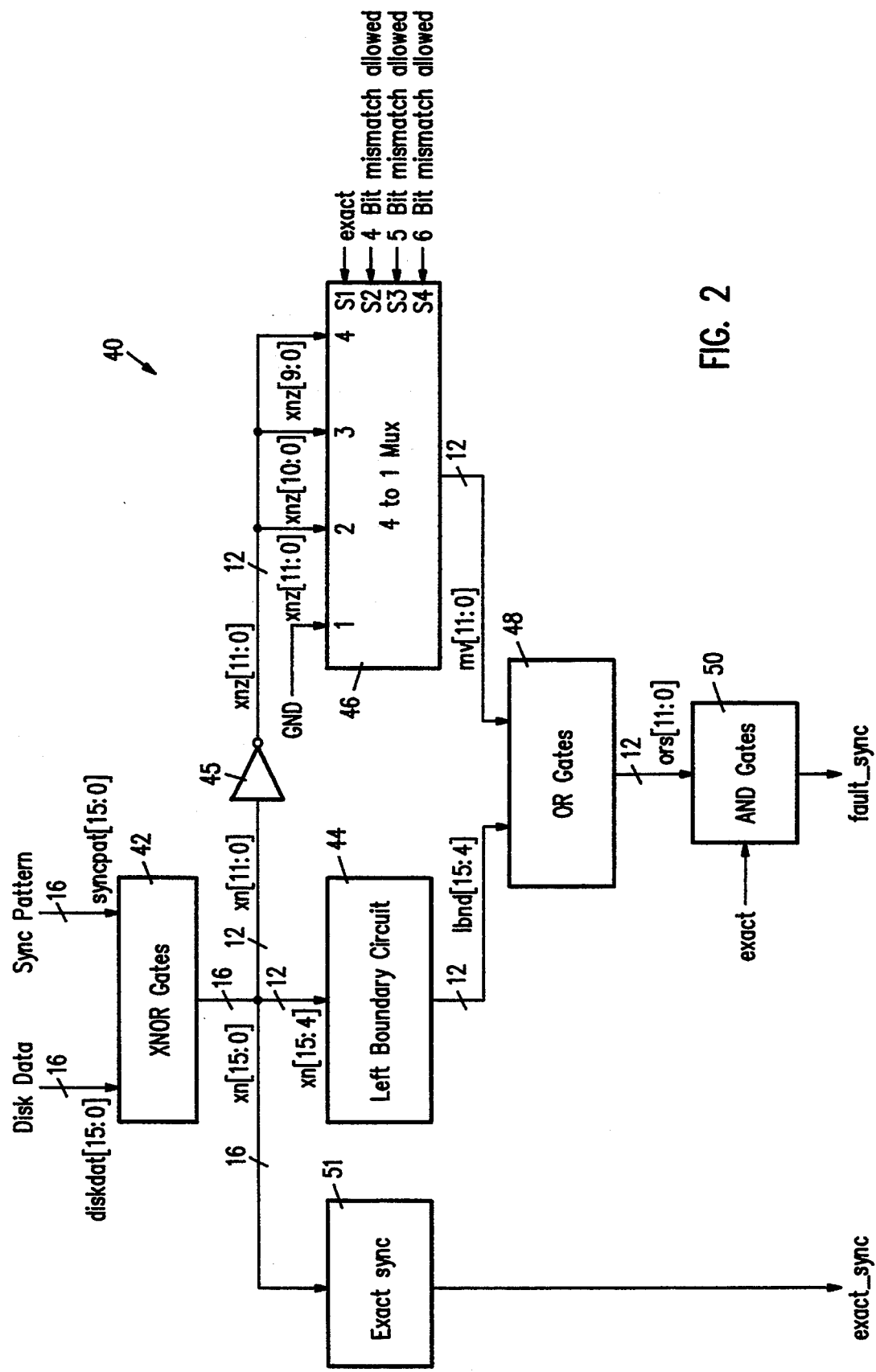
FIG. 2 is a block diagram illustrating a fault tolerant comparator in accordance with the present invention.

Referring to FIG. 2, there is illustrated a fault tolerant comparator 40 in accordance with the present invention. The comparator 40 is normally contained in the synchronization stage of a disk drive controller. The comparator 40 compares incoming disk data diskdat [15:0] (that has been decoded by a read channel) to a synchronization pattern syncpat [15:0] in order to identify the beginning of the disk data and to establish synchronization between the disk drive controller and the disk data. The comparator 40 is capable of achieving synchronization pattern alignment even though there are errors in the synchronization pattern field of the disk data or in the preamble preceding the synchronization pattern field.

Although the discussion herein is directed to the use of the fault tolerant comparator 40 in disk drive applications, it should be understood that the comparator 40 may be used in other applications where byte boundaries must be identified and data byte synchronization must be established such as in local area networks (LANs), magnetic tape drives, etc.

A main component of the fault tolerant comparator 40 is the actual fault tolerant synchronization patterns that are used with the comparator 40. A set of preferred fault tolerant synchronization patterns is discussed in detail below. Although the synchronization patterns of the preferred set are sixteen bits wide, it should be understood that the present invention includes the use of synchronization patterns of other bit widths. By using one of the preferred fault tolerant synchronization patterns, the comparator 40 can establish synchronization even though there is an up to "six bit wide error burst" in the synchronization pattern field of the disk data or in the preamble preceding the synchronization pattern field. As used herein, the terminology a "six bit wide error burst" means an error in the binary data bits of the synchronization pattern field of the disk data or the preamble that is up to six bits wide, i.e., spans at most six bits. Similarly, a "four bit wide error burst" means an error in the data bits of the synchronization pattern field of the disk data or the preamble that is up to four bits wide. The preferred fault tolerant synchronization patterns have unique patterns such that with an error burst of up to six bits wide inserted before or in the patterns, the pattern is still unique enough for the fault tolerant comparator 40 to establish synchronization between the disk drive controller and the disk data.

As shown in FIG. 2, the comparator 40 includes a set of exclusive NOR gates 42, a left boundary circuit 44, a four-to-one multiplexer 46, a set of OR gates 48, and a set of AND gates 50.

The operation of the comparator 40 is best illustrated utilizing an example. Assume that the current disk data diskdat [15:0] being read by the read channel and the synchronization pattern syncpat [15:0] are as follows:

| 0110 | 1001 | 1100 | 0101 | diskdat[15:0] |
|------|------|------|------|---------------|
| 0111 | 1010 | 1100 | 0101 | syncpat[15:0] |

The exclusive NOR gates 42 are used to exclusive NOR the disk data diskdat [15:0] with the synchronization pattern syncpat [15:0] which gives the following result:

1110 1100 1111 1111      xn [15: 0]

Each zero in the output xn [15:0] of the exclusive NOR gates 42 indicates a mismatch between the disk data diskdat [15:0] and the synchronization pattern syncpat [15:0]. The size of the error burst is calculated by counting the number of bits from (and including) the left most zero to (and including) the right most zero of the output xn [15:0]. In this case, the error burst is five bits wide. If there are no zeros in the output xn [15:0], then there is a perfect match between the disk data diskdat [15:0] and the synchronization pattern syncpat [15:0].

The twelve most significant bits xn [15:4] of the exclusive NOR gates 42 output xn [15:0] are transferred to the left boundary circuit 44. The purpose of the left boundary circuit 44 is to locate the left boundary of the error burst, if one exists, in the output xn [15:4]. The left boundary circuit 44 indicates the location or position of the left boundary of the error burst by generating an output lbnd [15:4] that has all ones to the left of the left boundary and all zeros to the right of (and including) the left boundary. The operation of the left boundary circuit 44 will be explained in detail below. For the present example, however, the left boundary circuit 44 output lbnd [15:4] is as follows:

1110 0000 0000 (0000)      lbnd [15:4]

The zeros in parenthesis "(0000)" indicate that the four least significant bits lbnd [3:0] are not needed so they are not generated. The reason that these bits are not needed will become apparent below.

While the left boundary circuit 44 generates the output lbnd [15:4], the twelve least significant bits xn [11:0] of the output of the exclusive NOR gates 42 are inverted by the inverter 45 to form the input xnz [11:0] for the multiplexer 46. It should be noted that the symbol shown for the inverter 45 is representative of twelve inverters for inverting each bit of the output xn [11:0]. The multiplexer 46 realigns the input xnz [11:0] by shifting it a maximum allowable error burst width to the left. Preferably, the maximum allowable error burst width is either four, five, or six bits. A "left" shift is intended to mean that the least significant bit xnz [0] is shifted in a direction towards the more significant bit xnz [11]. This left shift moves any errors within the allowable error burst width beyond the left boundary of the error burst. If additional errors occur to the right of the left boundary, indicated by zeros, the error burst width is larger than the allowable error burst width.

The multiplexer 46 can be programmed to realign the input xnz [11:0] by either four, five, or six bits by setting the inputs S2, S3, or S4, respectively. If the multiplexer 46 is programmed to realign the output xnz [11:0] by four bits, then a four bit wide error burst will not cause a mismatch. If the multiplexer 46 is programmed to realign the output xnz [11:0] by five bits, then a five bit wide error burst will not cause a mismatch. Similarly, if the multiplexer 46 is programmed to realign the output xnz [11:0] by six bits, then a six bit wide error burst will not cause a mismatch.

If the multiplexer 46 is programmed to allow a four bit wide error burst, then the input bit xnz [11] will be transferred to the multiplexer output bit mv [11] so that it can be aligned with the most significant bit lbnd [15] of the output of the left boundary circuit 44. The input bit xnz [0] will be transferred to the multiplexer output bit my [0] so that it can be aligned with the bit lbnd [4] of the output of the left boundary circuit 44. If the multiplexer 46 is programmed to allow a five bit wide error burst, then the input bit xnz [10] will be transferred to the multiplexer output bit mv [11] so that it can be aligned with the most significant bit lbnd [15] of the output of the left boundary circuit 44. The input bit xnz [0] will be transferred to the multiplexer output bit my [1] so that it can be aligned with the bit lbnd [5] of the output of the left boundary circuit 44, and the least significant multiplexer output bit my [0] will be set equal to one. If the multiplexer 46 is programmed to allow a six bit wide error burst, then the input bit xnz [9] will be transferred to the multiplexer output bit mv [11] so that it can be aligned with the most significant bit lbnd [15] of the output of the left boundary circuit 44. The input bit xnz [0] will be transferred to the multiplexer output bit my [2] so that it can be aligned with the bit lbnd [6] of the output of the left boundary circuit 44, and the two least significant multiplexer output bits my [0] and mv [1] will both be set equal to one.

It should be noted that the multiplexer 46 outputs are inverting outputs and that the inversion caused by the inverter 45 is negated by the output of the multiplexer 46. Therefore, in the present example, the effects of the inverter 45 and the inverting outputs of the multiplexer 46 will be ignored in order to simplify the example.

Returning to the present example, it will first be assumed that input S4 of the multiplexer 46 is set so that the input xnz [11:0] will be realigned by six bit positions so that a six bit wide error burst will not cause a mismatch. The output of the multiplexer mv [11:0] will be as follows:

| | | | | |
|---|---|---|---|---|
| | 1110 | 0000 | 0000 | (0000) | lbnd[15:4] |

-continued

| | | | | |
|---|---|---|---|---|
| (1110 11) | 0011 | 1111 | 1111 | mv[11:0] |

The output lbnd [15:4] is also reproduced in order to illustrate its alignment to the output mv [11:0]. The ones and zeros in parenthesis "(1110 11)" in the output mv [11:0] indicate that these bits are not needed and so they are not generated. Furthermore, the two least significant bits of the output mv [11:0] are set equal to one as mentioned above.

The effect of the realignment of the output mv [11:0] is that the right boundary of the error burst is moved to the left by the maximum allowable error burst width, in this case six positions. If the actual error burst width is less than the preprogrammed allowable error burst width, then the right boundary of the actual error burst is moved to the left of the left boundary of the error burst. Whether the actual error burst width is less than or equal to the preprogrammed maximum error burst width is determined by the OR gates 48.

The OR gates 48 are used to OR the output lbnd [15:4] of the left boundary circuit 44 and the multiplexer 46 output mv [11:0]. In the present example, the output ors [11:0] of the OR gates is as follows:

| | | | | | |
|---|---|---|---|---|---|
| | 1110 | 0000 | 0000 | (0000) | lbnd[15:4] |
| (1110 11) | 0011 | 1111 | 1111 | | mv[11:0] |
| | 1111 | 1111 | 1111 | | ors[11:0] |

If the output ors [11:0] of the OR gates 48 are all ones, as in the present example, then the width of the actual error burst in the disk data diskdat [15:0] is equal to or less than the preprogrammed maximum allowable error burst width, in this case six. Because the actual error burst is within the allowable error burst width, the disk data diskdat [15:0] is considered to be aligned with the synchronization pattern syncpat [15:0] and synchronization is established.

The output ors [11:0] of the OR gates 48 is checked for zeros by ANDing together all of the bits in the output ors [11:0] with the AND gates 50. If the fault_sync output of the AND gates 50 is one, then there is a match and synchronization is established; however, if the fault_sync output of the AND gates 50 is zero, then there is no match and no synchronization.

The combination of the OR gates 48 and the AND gates 50 may be referred to as an error detection stage. Specifically, the basic purpose of the OR gates 48 and the AND gates 50 is to determine if the right boundary of the error burst in the multiplexer output mv [11:0] has been realigned such that it is located to the left of the left boundary of the error burst as indicated by the left boundary output pattern lbnd [15:4]. If the right boundary has been shifted to the left of the left boundary, then there is considered to be a match between the disk data diskdat [15:0] and the synchronization pattern syncpat [15:0]. It is envisioned that the basic function of this "error detection stage" may be performed by some other combination of logic gates.

In the next example, it will be assumed that the input S3 of the multiplexer 46 is set so that the maximum allowable error burst width is five. Assuming that the disk data diskdat [15:0] and the synchronization pattern syncpat [15:0] are unchanged, the output lbnd [15:4] of the left boundary circuit 44 will also be unchanged. The output mv [11:0] of the multiplexer 46 and the output ors [11:0] of the OR gates 48 will be as follows:

|  |  |  |  |  |  |
|---|---|---|---|---|---|
|  | 1110 | 0000 | 0000 | (0000) | lbnd[15:4] |
| (1110 1) | 1001 | 1111 | 1111 |  | mv[11:0] |
|  | 1111 | 1111 | 1111 |  | ors[11:0] |

The multiplexer 46 output mv [11:0] is shifted one less bit position than in the first example. However, because the actual error burst and the maximum allowable error burst is five, the output ors [11:0] of the OR gates 48 are still all ones which indicates a match.

Now it will be assumed that the input S2 of the multiplexer 46 is set so that the maximum allowable error burst width is four. Assuming that the disk data diskdat [15:0] and the synchronization pattern syncpat [15:0] are unchanged, the output lbnd [15:4] of the left boundary circuit 44 will also be unchanged. The output mv [11:0] of the multiplexer 46 and the output ors [11:0] of the OR gates 48 will be as follows:

|  |  |  |  |  |  |
|---|---|---|---|---|---|
|  | 1110 | 0000 | 0000 | (0000) | lbnd[15:4] |
| (1110) | 1100 | 1111 | 1111 |  | mv[11:0] |
|  | 1110 | 1111 | 1111 |  | ors[11:0] |

The multiplexer 46 output mv [11:0] is shifted two less bit positions than in the first example. This four bit position shift does not completely shift all of the errors past the left boundary of the error burst. The zero that now occurs in the output ors [11:0] will cause the fault_sync output of the AND gates 50 to be zero, indicating a mismatch outside the allowable error burst limit and no synchronization. The mismatch occurs because the actual error burst width, i.e., five, is larger than the preprogrammed maximum allowable error burst width, i.e., four. The multiplexer 46 does not shift the entire actual error burst completely to the left of the left boundary of the error burst. This causes a zero to be present in the output ors [11:0] of the OR gates 48.

In order to program the comparator 40 so that only an exact match between the disk data diskdat [15:0] and the synchronization pattern syncpat [15:0] will establish synchronization, the input S1 of the multiplexer is set via the exact signal. If the input S1 is set, then the disk drive controller will look for an exact_sync signal generated by an exact synchronization circuit 51 instead of the fault_sync signal generated by the AND gates 50. In order for the fault_sync signal not to have an effect on the disk drive controller, the fault_sync signal is set equal to zero by the exact signal which is received by the AND gates 50.

All sixteen bits of the exclusive NOR gates 42 output xn [15:0] are received by the exact sync circuit 51. As will be discussed below, the exact synchronization circuit 51 ANDs all of the bits of the output xn [15:0] together. If a zero is present in the output xn [15:0] (which indicates a mismatch), then the exact_sync signal will be zero. When the exact_sync signal is zero, then the disk data diskdat [15:0] does not exactly match the synchronization pattern syncpat [15:0].

Figure 3:
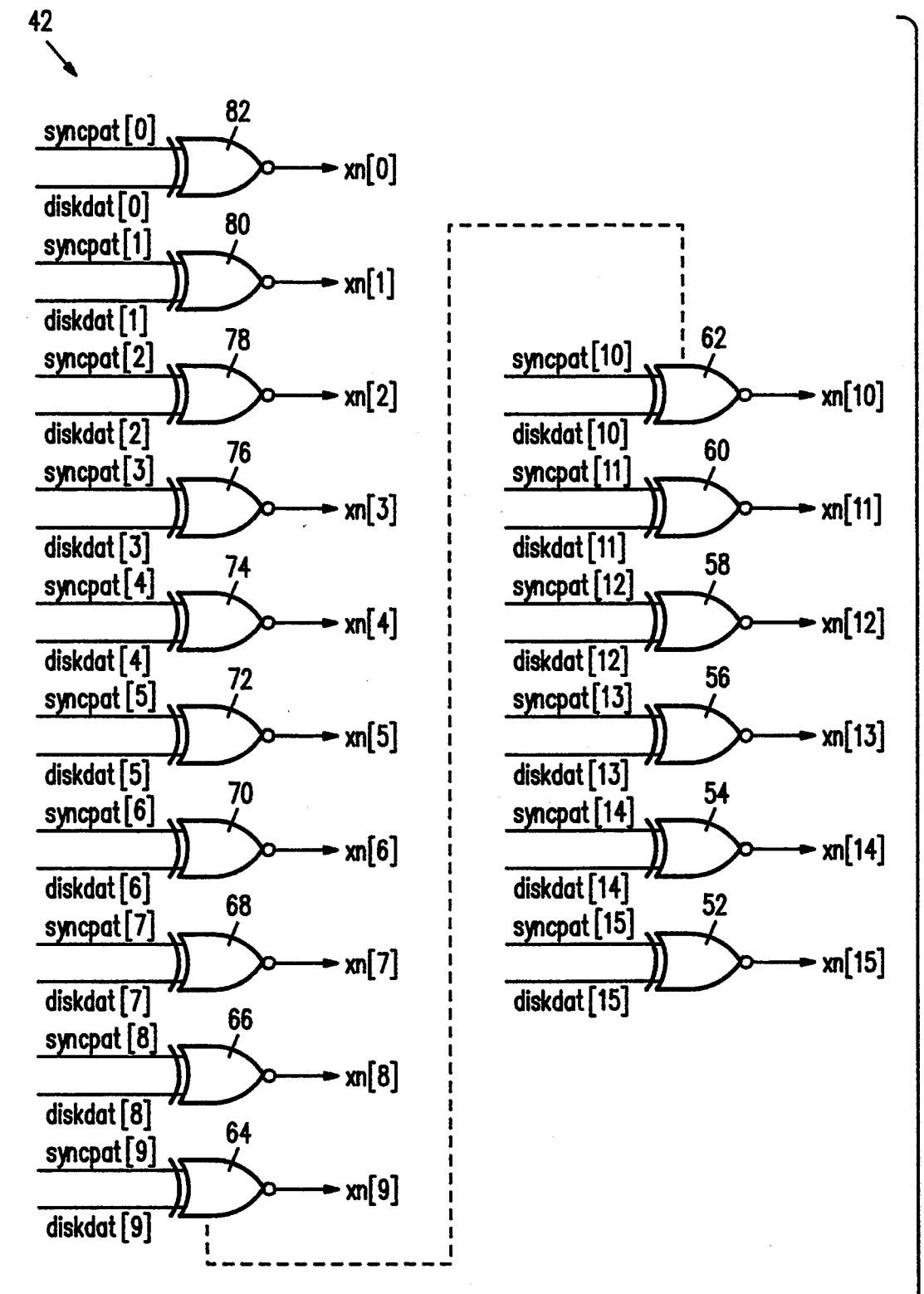
FIG. 3 is a schematic diagram illustrating the exclusive NOR gates shown in FIG. 2.

FIG. 3 shows the detailed circuitry of the exclusive NOR gates 42. Each bit of the disk data diskdat [15:0] is exclusive NORed with each corresponding bit of the synchronization pattern syncpat [15:0] by the exclusive NOR gates 52-82. Although the use of exclusive NOR gates is preferred, it should be understood that the exclusive OR function is the primary function used to determine a mismatch between the disk data diskdat [15:0] and the synchronization pattern syncpat [15:0]. The comparator 40 could be modified to function with exclusive OR gates substituted for the exclusive NOR gates 42. Such substitutions will be discussed in more detail below. Furthermore, because an exclusive NOR is simply the inversion of an exclusive OR, it should be understood herein that an exclusive NOR includes the exclusive OR function.

Figure 4:
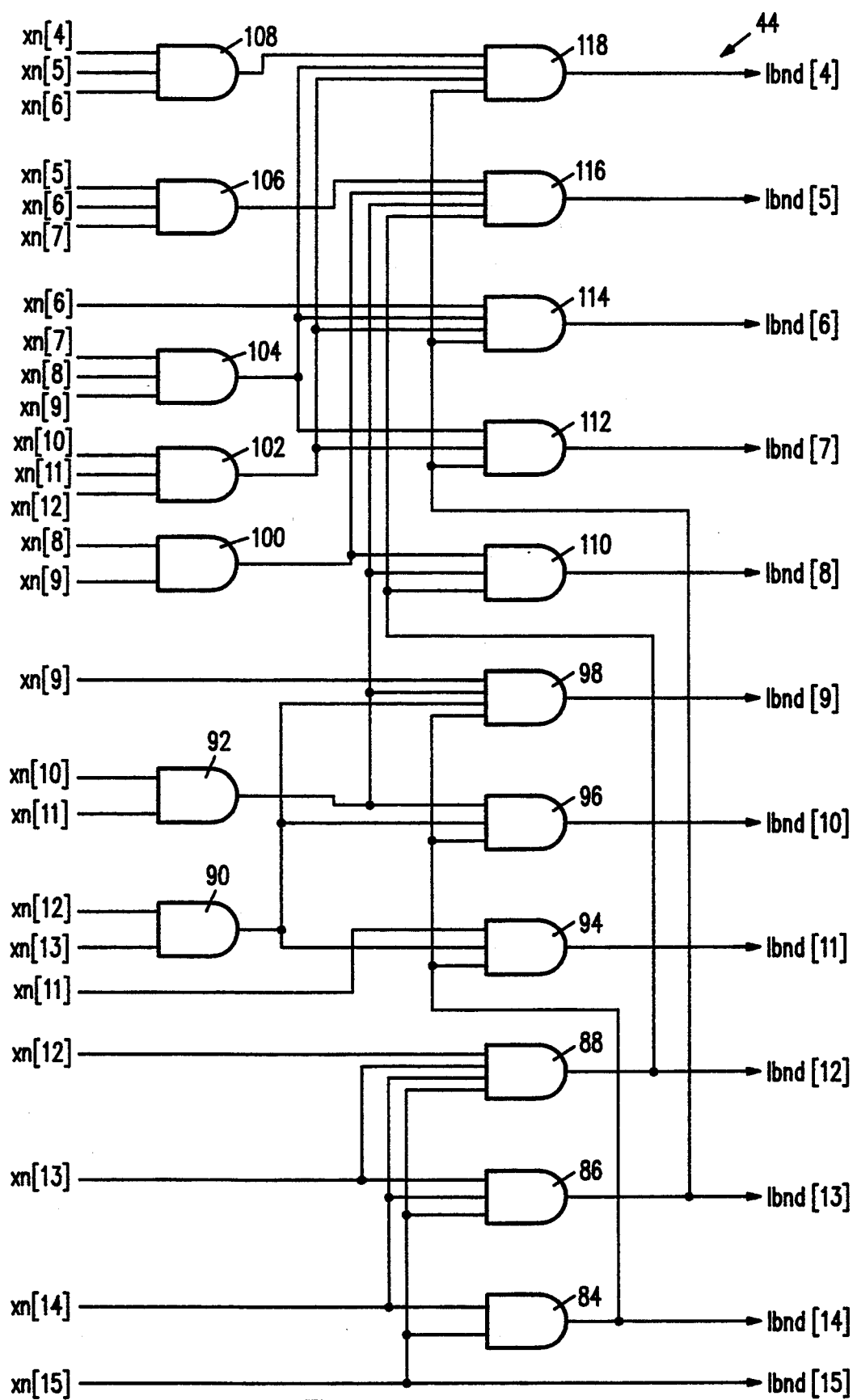
FIG. 4 is a schematic diagram illustrating the left boundary circuit shown in FIG. 2.

FIG. 4 shows the detailed circuitry of the left boundary circuit 44. The simplest way to locate the left boundary of the error burst in the output xn [15:0] is to begin with the most significant bit xn [15], i.e., the left side, and AND that bit with the second most significant bit xn [14], and then AND the result with the third most significant bit xn [13], continuing this sequential ANDing along the entire bit string xn [15:4]. Any zeros in the output xn [15:4] will set all the bit positions to the right of that zero to be zeros also. The result will be the output lbnd [15:4] described above having all ones to the left of the left boundary of the error burst and all zeros to the right of (and including) the left boundary of the error burst.

Although the method of sequentially ANDing the successive bits of the output xn [15:4] in order to locate the left boundary of the error burst is simple, it is inefficient because of the long propagation delay involved with completing all of the ANDs. The left boundary circuit 44 shown in FIG. 4 locates the left boundary of the error burst in a similar manner, but the circuit 44 accomplishes this function with a reduced propagation delay of only two gate delays. Specifically, the most significant bit xn [15] is transferred directly to the most significant bit lbnd [15] of the output of the left boundary circuit 44. The most significant bit xn [15] is also ANDed with the second most significant bit xn [14] by the AND gate 84. The output of the AND gate 84 is the second most significant bit lbnd [14] of the left boundary circuit 44 output. The first, second, and third most significant bits xn [15], xn [14], and xn [13] are ANDed together by the AND gate 86. The output of the AND gate 86 is the third most significant bit lbnd [13] of the left boundary circuit 44 output. The first, second, third, and fourth most significant bits xn [15], xn [14], xn [13], and xn [12] are ANDed together by the AND gate 88. The output of the AND gate 88 is the fourth most significant bit lbnd [12] of the left boundary circuit 44 output. Thus, the four most significant bits lbnd [15], lbnd [14], lbnd [13], and lbnd [12] are generated with only one gate delay.

The fifth most significant bit lbnd [11] is generated by first ANDing the bits xn [12] and xn [13] with the AND gate 90. The output of the AND gate 90 is ANDed with the bit xn [11] and the output of the AND gate 84 by the AND gate 94. Thus, the fifth most significant bit lbnd [11] is generated with only two gate delays, i.e., the AND gate 90 and the AND gate 94. The rest of the output bits lbnd [10:4] of the left boundary circuit 44 are generated in a similar manner with only two gate delays.

It should be noted that only the twelve most significant bits xn [15:4] of the output of the exclusive NOR gates 42 are utilized by the left boundary circuit 44. The output lbnd [15:4] of the left boundary circuit 44 is also only twelve bits wide. As illustrated above, only the twelve most significant bits lbnd [15:4] are needed because the multiplexer 46 output mv [11:0] will normally be realigned to the left by at least four bit positions. This realignment means that the four least significant bits lbnd [3:0] are not needed.

Figure 5A:
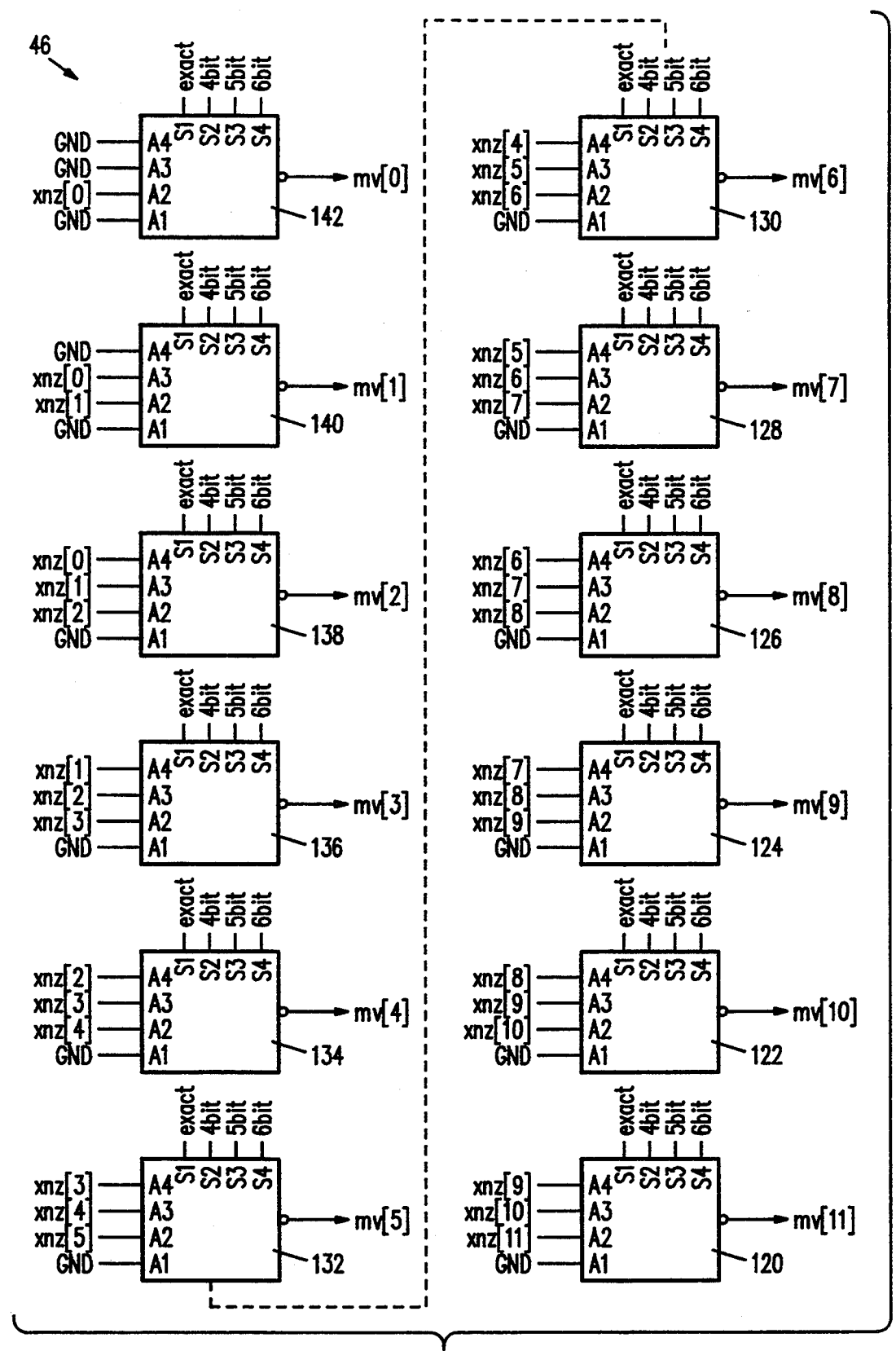
FIGS. 5A and 5B are schematic diagrams illustrating the multiplexer shown in FIG. 2.

FIG. 5A shows the detailed circuitry of the four-to-one multiplexer 46. The output mv [11:0] of the multiplexer 46 is also only twelve bits wide. Only the twelve most significant bits mv [11:0] are needed because, as mentioned above, the purpose of the multiplexer 46 is to realign the output xn [11:0] of the exclusive NOR gates 42 by at least four bits to the left. Thus, after realignment, the four most significant bits mv [15:12] are not needed.

The output bits mv [11:0] of the multiplexer 46 are generated by the individual multiplexers 120 through 142. As noted above, the individual multiplexers 120 through 142 have inverting outputs. Using the multiplexer 120 as an example, the inputs S2, S3, and S4 correspond to a realignment of the input xnz [11:0] of four, five, or six bits, respectively. Specifically, the bit xnz [11] is connected to the A2 input of the multiplexer 120; when the input S2 is set, the bit xnz [11] is transferred to the output mv [11]. The bit xnz [10] is connected to the A3 input; when the input S3 is set, the bit xnz [10] is transferred to the output mv [11]. The bit xnz [9] is connected to the A4 input; when the input S4 is set, the bit xnz [9] is transferred to the output mv [11].

Figure 5B:
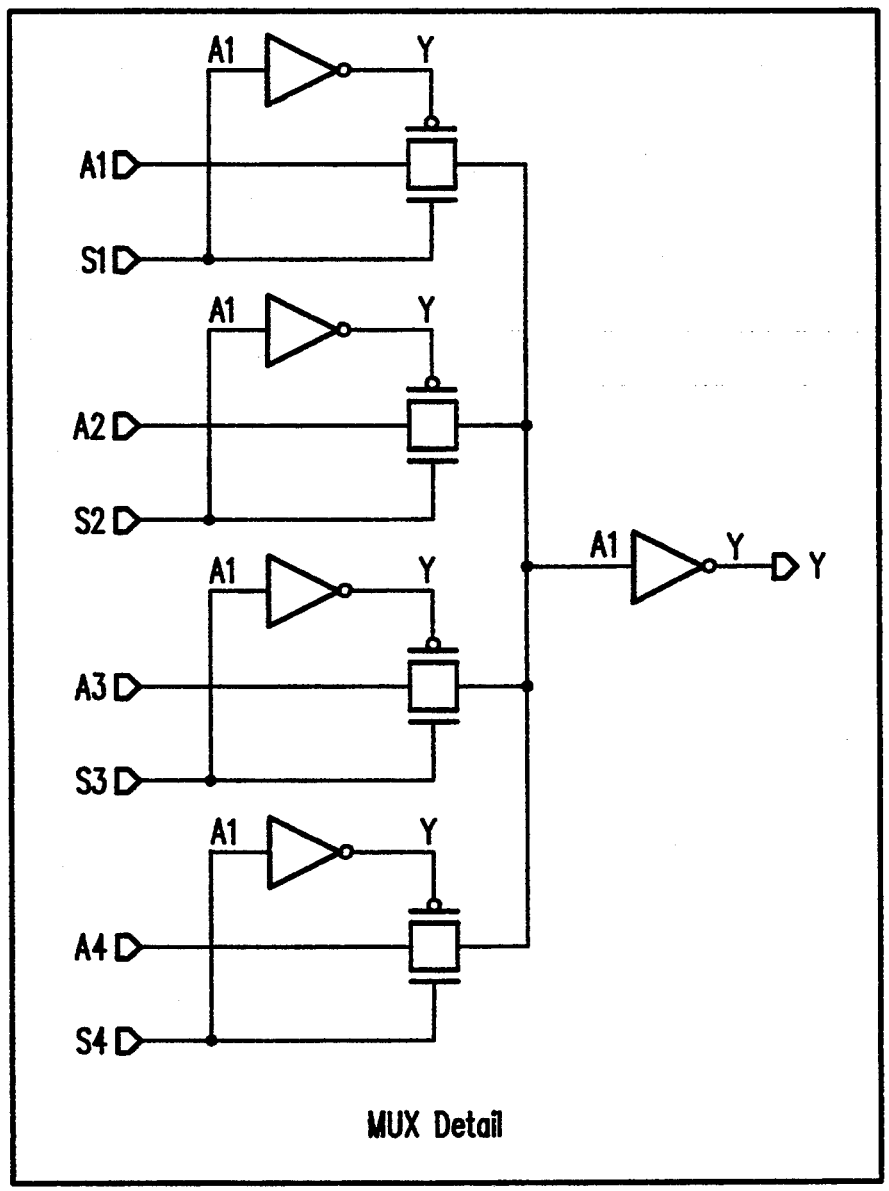

When the S4 input is set, the least significant bit xnz [0] is transferred to the output my [2] via the multiplexer 138. The A4 inputs of the multiplexers 142 and 140 are grounded so that when the S4 input is set, the bits mv [0] and mv [1] are set equal to one. Similarly, the A3 input of the multiplexer 142 is grounded so that when the S3 input is set, the bit mv [0] is set equal to one. Furthermore, the A1 input of each of the multiplexers 120 through 142 is grounded. When the exact synchronization input S1 is set, all of the output bits mv [0:11] are set equal to one. FIG. 5B illustrates the internal circuitry of one of the multiplexers 120 through 142.

Figure 6:
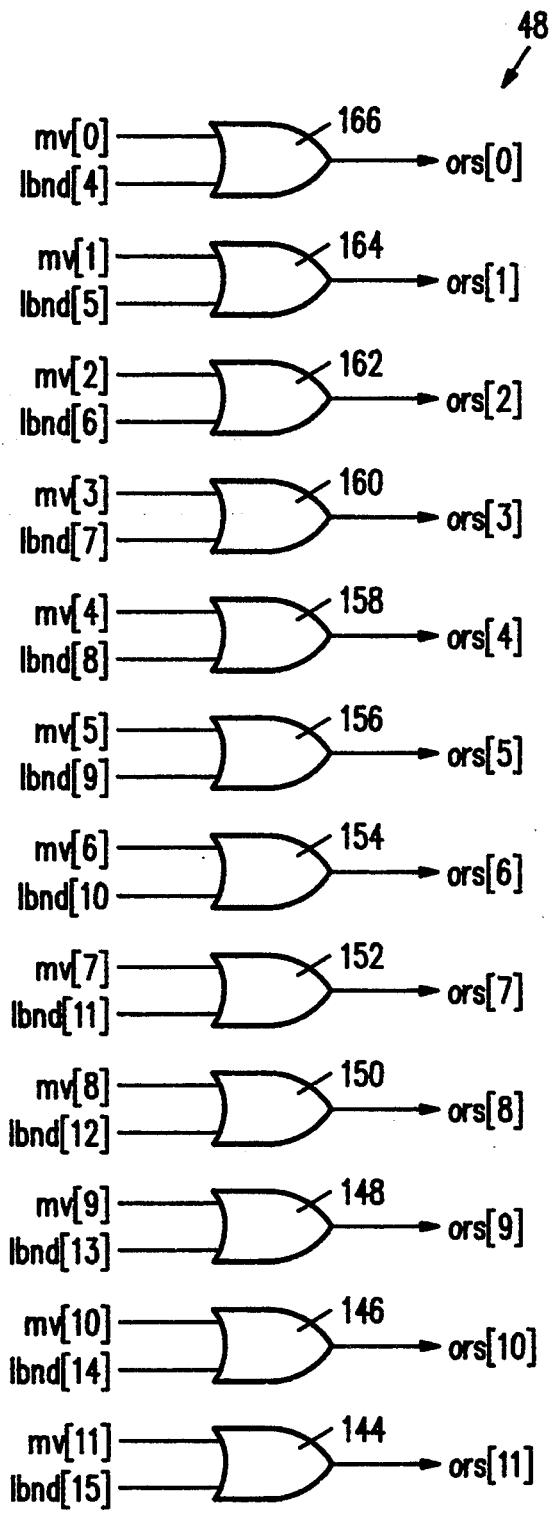
FIG. 6 is a schematic diagram illustrating the OR gates shown in FIG. 2.

FIG. 6 illustrates the detailed circuitry of the OR gates 48. Each bit of the output lbnd [15:4] of the left boundary circuit 44 is ORed with each corresponding bit of the output mv [11:0] of the multiplexer 46 via the OR gates 144 through 166. The output of the OR gates 144 through 166 form the output ors [11:0].

Figure 7:
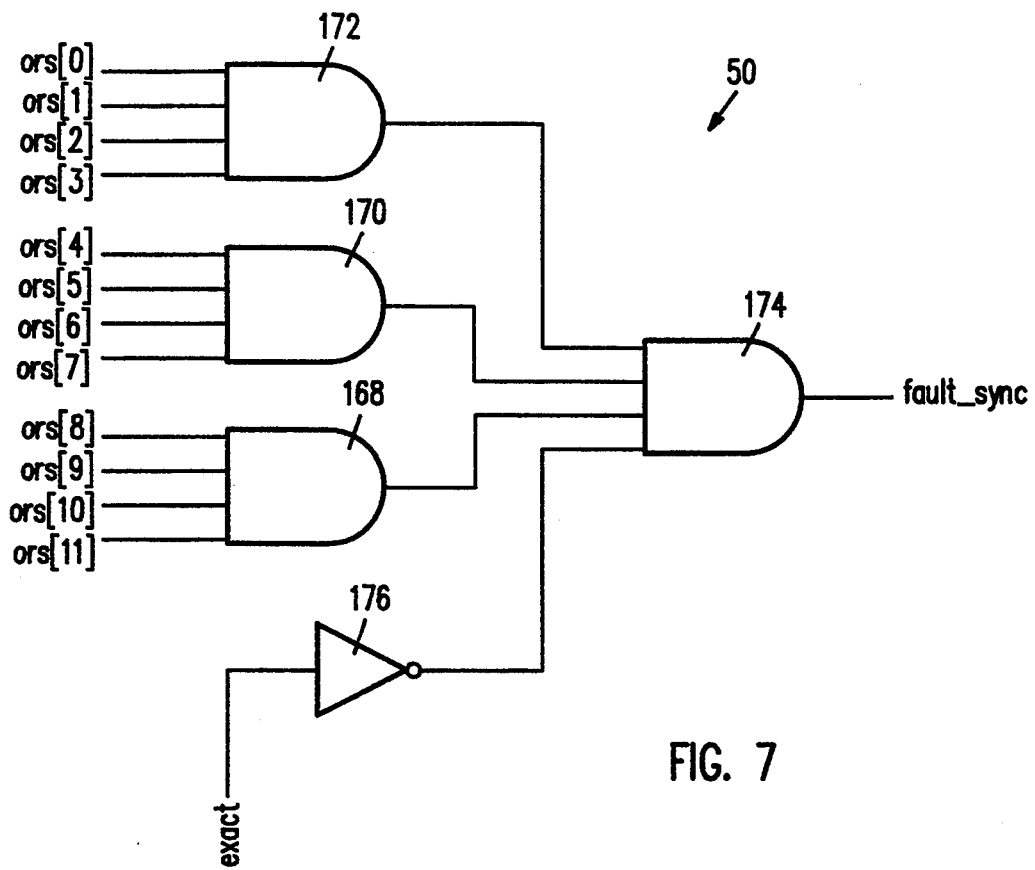
FIG. 7 is a schematic diagram illustrating the AND gates shown in FIG. 2.

FIG. 7 illustrates the detailed circuitry of the AND gates 50. The circuit 50 includes four, four input AND gates 168 through 174. The AND gate 168 receives the inputs ors [11:8], the AND gate 170 receives the inputs ors [7:4], and the AND gate 172 receives the inputs ors [3:0]. The outputs of the AND gates 168, 170, and 172 are ANDed by the AND gate 174. The output of the AND gate 174 is the fault_sync signal. The AND gate also receives as an input an inversion of the exact signal. Thus, when the comparator 40 is programmed to require and exact match between the disk data diskdat [15:0] and the synchronization pattern syncpat [15:0] in order to establish synchronization, the fault_sync signal will be set to zero and the exact_sync signal will control.

Figure 8:
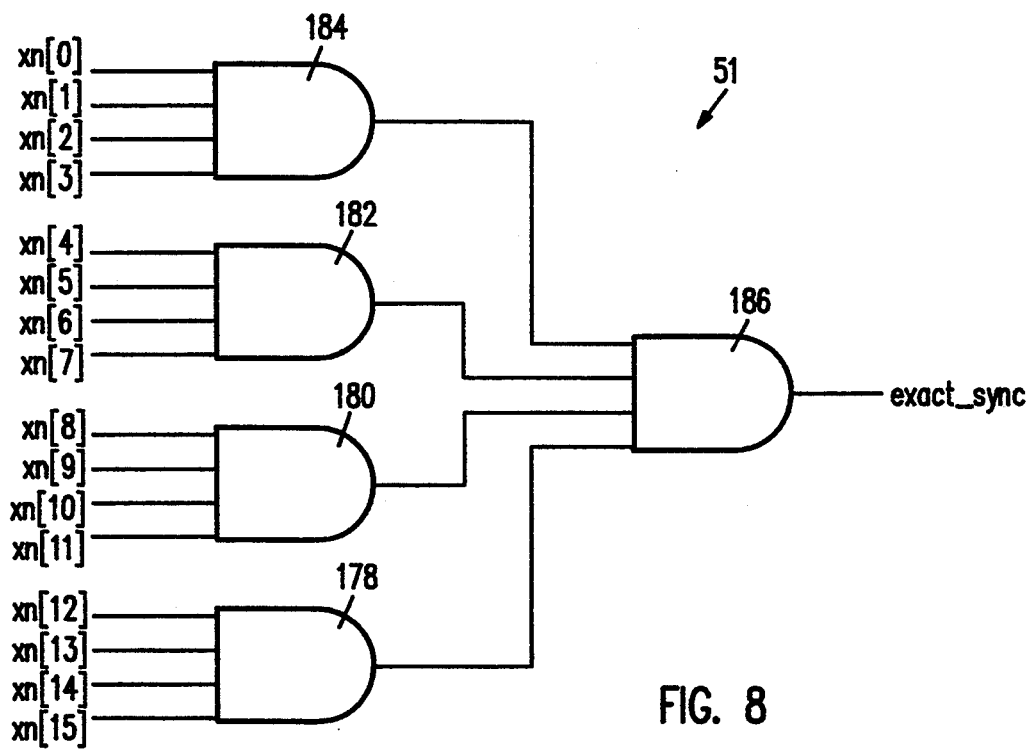
FIG. 8 is a schematic diagram illustrating the exact synchronization circuit shown in FIG. 2.

FIG. 8 illustrates the detailed circuitry of the exact synchronization circuit 51. The circuit 51 includes five, four input AND gates 178 through 186. The circuit 51 simply ANDs together all of the output bits xn [15:0] of the exclusive NOR gates 42. If any zeros are present in the bits xn [15:0], the exact_sync signal will be zero indicating that there is not a perfect match between the disk data diskdat [15:0] and the synchronization pattern syncpat [15:0].

For the fault tolerant comparator 40 to function properly, it should preferably use a set of synchronization patterns syncpat [15:0] that have unique patterns such that they (with errors inserted) will not fool the comparator 40 into erroneous synchronization. In other words, the synchronization patterns should have the ability to withstand an error burst of the preprogrammed maximum allowable width. For example, a pattern like "11111111" is not a good synchronization pattern because it is not unique enough. If an error burst of "11" is inserted before it, the comparator 40 might synchronize two bits before the actual synchronization pattern boundary.

Two criteria are used for choosing synchronization patterns. The first criteria is the pattern's ability to withstand an error burst when in binary form. The second criteria is the pattern's error propagation characteristics when it is decoded from the encoded flux changes on the disk surface to binary form by the disk drive read channel.

With respect to the second criteria, a single flux error on the magnetic disk media can propagate up to nine bits of error in the decoded binary data. Flux errors are generally in the form of drop in, drop out, and shifted fluxes. As discussed above, there are many different data encoding methods that can be used to record binary information on a magnetic media, such as the non-return-to-zero (NRZ) method. The width of the error burst in the resulting binary data that a single flux error will propagate depends upon the data encoding method that is used. For the NRZ to (1,7) run-length-limited (RLL) code encoding method, a typical read channel decoder propagates an average error burst width of six bits in the resulting binary data. Therefore, because the resulting binary form of the synchronization pattern will on average have a six bit wide error burst, the binary form of the synchronization patterns to be used with the comparator 40 should preferably be capable of tolerating a six bit wide error burst.

With respect to the first criteria, i.e., the synchronization pattern's ability to withstand an error burst when in binary form, an exhaustive search of all possible different synchronization patterns was conducted. Pursuant to this search, a six bit wide error burst was inserted into each different pattern and then the patterns were tested for uniqueness to determine if they could tolerate the error burst. The search yielded a set of 2127 sixteen bit patterns that can tolerate or withstand a six bit wide error burst. These synchronization patterns are listed in Table 1 below. The patterns are listed in hexadecimal digits.

TABLE 1

| 80cb | 8143 | 8147 | 814b | 814d | 8153 | 8157 | 8167 | 817d | 8185 | 818d | 818e | 819d | 819e |
|------|------|------|------|------|------|------|------|------|------|------|------|------|------|
| 81ae | 81be | 81c5 | 81cd | 81e5 | 81fd | 81fe | 8246 | 824a | 824c | 824e | 8256 | 825a | 825c |
| 825e | 826c | 826e | 8276 | 827a | 827c | 827e | 8283 | 8287 | 8289 | 828b | 828c | 828d | 828f |
| 8293 | 8297 | 829b | 829c | 829d | 82a3 | 82a7 | 82a9 | 82ab | 82ac | 82ad | 82af | 82b3 | 82b7 |
| 82b9 | 82bc | 82bd | 82ca | 82cd | 82ce | 82d9 | 82da | 82dc | 82de | 82e6 | 82e9 | 82ec | 82f6 |
| 82f9 | 82fa | 82fc | 82fd | 82fe | 8305 | 8307 | 8309 | 830a | 830b | 830d | 830e | 830f | 8317 |
| 8319 | 831a | 831b | 831d | 831e | 8325 | 8327 | 832b | 832d | 832e | 832f | 8335 | 8337 | 833a |

TABLE 1-continued

| | | | | | | | | | | | | |
|---|---|---|---|---|---|---|---|---|---|---|---|---|
| 833b | 833d | 833e | 8347 | 834b | 834c | 834e | 834f | 8357 | 8359 | 835c | 835e | 8367 | 8369 |
| 836c | 836e | 836f | 8379 | 837a | 837c | 837e | 8385 | 8389 | 838a | 838b | 838d | 838f | 839a |
| 839b | 839d | 83a5 | 83a9 | 83ab | 83ac | 83af | 83b5 | 83b9 | 83bc | 83c5 | 83c6 | 83ca |
| 83cb | 83cd | 83d6 | 83d9 | 83da | 83dc | 83e5 | 83e6 | 83e9 | 83eb | 83ec | 83f5 | 83f6 | 83f9 |
| 83fa | 83fb | 83fc | 83fd | 83fe | 84c7 | 84d7 | 858e | 859e | 85ae | 85be | 85fe | 864a | 864e |
| 865a | 865e | 866e | 867a | 867e | 8685 | 8687 | 8689 | 868b | 868c | 8697 | 869b | 869c | 86a7 |
| 86a9 | 86ab | 86ac | 86b7 | 86b9 | 86bc | 86c5 | 86ca | 86ce | 86d9 | 86da | 86dc | 86de | 86e5 |
| 86e9 | 86ec | 86f5 | 86f9 | 86fa | 86fe | 86fe | 8705 | 8706 | 8709 | 870a | 870b | 870d | 8716 |
| 8719 | 871a | 871b | 871d | 8725 | 8726 | 872b | 872d | 8735 | 873a | 873b | 873d | 8746 | 874b |
| 874c | 8756 | 8759 | 875c | 8769 | 876c | 8776 | 8779 | 877a | 877c | 8785 | 8789 | 878a | 878d |
| 879a | 879d | 87a5 | 87a9 | 87b5 | 87b9 | 87ba | 88cb | 8943 | 8947 | 8953 | 8957 | 8967 | 8985 |
| 898e | 899d | 899e | 89ae | 89be | 89c5 | 89e5 | 89f5 | 89fd | 89fe | 8a46 | 8a4c | 8a4e | 8a56 |
| 8a5c | 8a5e | 8a6c | 8a6e | 8a76 | 8a7c | 8a7e | 8ace | 8ad9 | 8adc | 8ade | 8ae6 | 8ae9 | 8aec |
| 8af6 | 8af9 | 8afc | 8afe | 8b03 | 8b07 | 8b09 | 8b0d | 8b0e | 8b0f | 8b13 | 8b17 | 8b19 | 8b1a |
| 8b1d | 8b1e | 8b23 | 8b27 | 8b2d | 8b2e | 8b2f | 8b37 | 8b3a | 8b3d | 8b3e | 8b43 | 8b47 | 8b4c |
| 8b4e | 8b4f | 8b53 | 8b57 | 8b59 | 8b5c | 8b5e | 8b63 | 8b67 | 8b69 | 8b6c | 8b6e | 8b6f | 8b73 |
| 8b79 | 8b7a | 8b7c | 8b7e | 8b83 | 8b89 | 8b8d | 8b8f | 8b93 | 8b9a | 8b9d | 8ba3 | 8ba9 | 8bac |
| 8baf | 8bb3 | 8bb9 | 8bba | 8bbc | 8bc3 | 8bc6 | 8bcd | 8bd3 | 8bd6 | 8bd9 | 8bda | 8bdc | 8be3 |
| 8be6 | 8be9 | 8bec | 8bf3 | 8bf6 | 8bf9 | 8bfa | 8bfc | 8bfd | 8bfe | 8d47 | 8d4f | 8d57 | 8d67 |
| 8d6f | 8e46 | 8e56 | 8e5a | 8e76 | 8e7a | 8e85 | 8e89 | 8e8b | 8e8c | 8e9b | 8e9c | 8ea9 | 8eab |
| 8eac | 8eb9 | 8ebc | 8ec5 | 8ed9 | 8eda | 8ee5 | 8ee6 | 8edc | 8ef6 | 8ef9 | 8efa |
| 8efc | 8f06 | 8f09 | 8f0b | 8f0d | 8f16 | 8f19 | 8f1b | 8f1d | 8f26 | 8f2b | 8f2d | 8f3b | 8f3d |
| 8f46 | 8f4b | 8f4c | 8f56 | 8f59 | 8f5c | 8f69 | 8f6c | 8f76 | 8f79 | 8f7c | 8f89 | 8fa9 | 8fb9 |
| 90cb | 9143 | 9147 | 914b | 914d | 9167 | 9185 | 918d | 918e | 919e | 91be | 91c5 | 91cd | 91e5 |
| 91f6 | 91fd | 91fe | 9203 | 9205 | 9207 | 9213 | 9217 | 9223 | 9225 | 9227 | 9235 | 9283 |
| 9287 | 928b | 928c | 928f | 9293 | 9297 | 9298 | 929c | 929d | 92a3 | 92a7 | 92a8 | 92ab | 92ac |
| 92af | 92b3 | 92b7 | 92b8 | 92bc | 92bd | 92c8 | 92ca | 92ce | 92d8 | 92da | 92dc | 92de | 92e6 |
| 92e8 | 92ec | 92f8 | 92fa | 92fc | 92fd | 92fe | 9305 | 9307 | 930a | 930b | 930d | 930e | 930f |
| 9317 | 931a | 931d | 931e | 9325 | 9327 | 9328 | 932b | 932e | 932f | 9335 | 9337 | 9338 | 933a |
| 933b | 933d | 933e | 9347 | 9348 | 934b | 934c | 934e | 934f | 9357 | 9358 | 935c | 935e | 9367 |
| 9368 | 936c | 936e | 936f | 9378 | 937a | 937c | 937e | 9385 | 938a | 938b | 938d | 938f | 9398 |
| 939a | 939d | 93a5 | 93a8 | 93ab | 93ac | 93af | 93b5 | 93b8 | 93ba | 93bc | 93c5 | 93c6 | 93c8 |
| 93ca | 93cb | 93cd | 93d6 | 93d8 | 93da | 93dc | 93e5 | 93e6 | 93e8 | 93eb | 93ec | 93f5 | 93f8 |
| 93fa | 93fb | 93fc | 93fd | 93fe | 94c7 | 94cb | 94cf | 94d7 | 958e | 959e | 95be | 95f6 | 95fe |
| 9603 | 9607 | 9613 | 9617 | 961d | 9623 | 9627 | 9637 | 963d | 9683 | 9687 | 968c | 9693 | 9697 |
| 9698 | 969c | 96a3 | 96a7 | 96a8 | 96ac | 96b3 | 96b7 | 96b8 | 96bc | 9703 | 9706 | 970a | 970d |
| 9713 | 9716 | 971a | 971d | 9723 | 9726 | 973a | 973d | 9743 | 9746 | 974c | 9753 | 9756 | 975c |
| 9763 | 976c | 9773 | 977a | 977c | 978a | 978d | 979a | 979d | 97ba | 9947 | 994d | 9957 | 9967 |
| 997d | 99c5 | 99cd | 99e5 | 9a07 | 9a0b | 9a17 | 9a27 | 9a2b | 9a37 | 9a3b | 9ace | 9adc | 9ade |
| 9aec | 9afc | 9afe | 9b05 | 9b07 | 9b0e | 9b17 | 9b1a | 9b1e | 9b25 | 9b27 | 9b28 | 9b2e | 9b37 |
| 9b38 | 9b3a | 9b3e | 9b85 | 9b8f | 9b98 | 9b9a | 9ba5 | 9ba8 | 9bac | 9baf | 9bb8 | 9bba | 9bbc |
| 9bc5 | 9bc8 | 9bd8 | 9bda | 9bdc | 9be5 | 9be8 | 9bec | 9bf8 | 9bfa | 96fe | 9e05 | 9e0b |
| 9e0d | 9e1d | 9e25 | 9e2b | 9e3b | 9e3d | 9e85 | 9e8b | 9e8c | 9e98 | 9e9c | 9ea8 | 9eab | 9eac |
| 9eb8 | 9ebc | 9ec5 | 9ec8 | 9ed8 | 9eda | 9edc | 9ee5 | 9ee6 | 9ee8 | 9eec | 9ef8 | 9efa | 9efc |
| 9f06 | 9f0b | 9f1d | 9f26 | 9f2b | 9f3d | 9f46 | 9f4b | 9f4c | 9f5c | 9f6c | 9f7c | a0cb | a0eb |
| a18e | a19e | a1ae | a1be | a1e6 | a1fe | a243 | a247 | a24b | a24f | a256 | a25c | a25e | a267 |
| a26b | a26f | a276 | a27c | a27e | a2ce | a2dc | a2de | a2ec | a2fc | a2fe | a307 | a309 |
| a30b | a30d | a30e | a30f | a317 | a31b | a31d | a31e | a327 | a32b | a32f | a32e | a32f | a337 |
| a33d | a33e | a347 | a34b | a34e | a34f | a357 | a359 | a35c | a35e | a367 | a369 | a36c | a36f |
| a379 | a37c | a37e | a389 | a38b | a38d | a38f | a39b | a39d | a3a9 | a3ab | a3ac | a3af | a3b9 |
| a3bc | a3c6 | a3cb | a3cd | a3d6 | a3d9 | a3dc | a3e9 | a3eb | a3f6 | a3f9 | a3fb | a3fc |
| a3fd | a3fe | a4c7 | a4d7 | a58e | a59e | a5ae | a5be | a5e6 | a5fe | a607 | a60b | a60d | a61e |
| a627 | a62b | a62d | a63e | a6ce | a6d8 | a6dc | a6de | a6e8 | a6ec | a6f8 | a6fc | a6fe | a706 |
| a70b | a70d | a716 | a71b | a71d | a726 | a72b | a72d | a73d | a746 | a74b | a756 | a75c | a76c |
| a776 | a77c | a78d | a79d | a8cb | a8eb | a8fb | a98e | a99e | a9ae | a9be | a9e6 | a9fe | aa03 |
| aa06 | aa07 | aa09 | aa0b | aa0d | aa0e | aa13 | aa16 | aa17 | aa1b | aa1e | aa23 | aa27 | aa29 |
| aa2b | aa2d | aa39 | aa3d | aa3e | aa43 | aa46 | aa47 | aa4b | aa4e | aa53 | aa56 | aa57 | aa58 |
| aa5c | aa5e | aa67 | aa68 | aa6b | aa6c | aa76 | aa78 | aa7c | aa7e | aad4 | aadc | aade | aaf4 |
| aaf6 | aafc | aafe | ab03 | ab07 | ab09 | ab0d | ab0e | ab0f | ab13 | ab17 | ab1d | ab1e | ab23 |
| ab27 | ab28 | ab2d | ab2e | ab2f | ab37 | ab38 | ab3d | ab3e | ab43 | ab47 | ab48 | ab4e | ab4f |
| ab53 | ab54 | ab57 | ab58 | ab59 | ab5c | ab5e | ab63 | ab64 | ab67 | ab68 | ab69 | ab6c | ab6f |
| ab73 | ab74 | ab78 | ab79 | ab7c | ab7e | ab83 | ab84 | ab89 | ab8d | ab8f | ab93 | ab94 | ab98 |
| ab9d | aba3 | aba8 | aba9 | abac | abaf | abb4 | abb8 | abb9 | abbc | abc3 | abc6 | abc8 | abcd |
| abd3 | abd4 | abd6 | abd8 | abd9 | abdc | abe3 | abe4 | abe8 | abec | abf3 | abf4 | abf6 |
| abf8 | abf9 | abfc | abfd | abfe | ad07 | ad0f | ad17 | addc | adec | adfc | ae03 | ae06 | ae09 |
| ae0d | ae13 | ae16 | ae23 | ae29 | ae2d | ae39 | ae3d | ae43 | ae46 | ae53 | ae54 | ae56 | ae58 |
| ae64 | ae68 | ae74 | ae76 | ae78 | af03 | af06 | af09 | af0d | af13 | af16 | af1d | af23 | af26 |
| af2d | af3d | af43 | af46 | af53 | af54 | af56 | af59 | af5c | af63 | af64 | af69 | af6c | af73 |
| af74 | af76 | af79 | af7c | af89 | afa9 | afb9 | b107 | b117 | b127 | b137 | b203 | b207 | b20a |
| b20e | b213 | b217 | b21a | b21e | b223 | b227 | b22e | b237 | b23a | b23e | b283 | b287 | b28f |
| b293 | b297 | b29d | b2a3 | b2a7 | b2af | b2b7 | b2bd | b347 | b34f | b354 | b358 | b35e | b367 |
| b36f | b374 | b378 | b37a | b37c | b38a | b38d | b38f | b394 | b398 | b39a | b3a8 | b3af | b3b4 |
| b3b8 | b3ba | b3ca | b3cd | b3d4 | b3d8 | b3da | b3e8 | b3f4 | b3f8 | b3fa | b3fd | b3fe | b5e4 |
| b5ec | b5f4 | b5fc | b603 | b607 | b60a | b60e | b613 | b617 | b61a | b61e | b623 | b627 | b62e |
| b637 | b639 | b63a | b63e | b643 | b647 | b648 | b64a | b64e | b653 | b654 | b657 | b658 | b65a |
| b65e | b667 | b668 | b674 | b678 | b67a | b67e | b683 | b687 | b693 | b697 | b6a3 | b6a7 | b6b7 |
| b703 | b71a | b723 | b73a | b78a | b79a | b7a9 | b7b9 | b7ba | ba03 | ba06 | ba13 | ba16 | ba23 |
| ba26 | ba29 | ba39 | ba43 | ba46 | ba48 | ba53 | ba56 | ba58 | ba5c | ba68 | ba6c | ba78 | ba7c |
| bb03 | bb13 | bb1a | bb23 | bb28 | bb38 | bb3a | bbc3 | bbd4 | bbd8 | bbda | bbdc | bbe3 | bbf4 |
| bbf8 | bbfa | bbfc | bdac | bdb4 | bdbc | be03 | be06 | be0d | be13 | be16 | be1a | be1d | be23 |
| be26 | be29 | be39 | be3a | be3d | be43 | be46 | be48 | be53 | be54 | be56 | be58 | be5a | be68 |
| be74 | be78 | be7a | be83 | be93 | bea3 | bea9 | beb9 | bf03 | bf06 | bf13 | bf23 | bf3d | bf43 |

TABLE 1-continued

| | | | | | | | | | | | | |
|---|---|---|---|---|---|---|---|---|---|---|---|---|
| bf46 | bf53 | bf54 | bf5c | bf63 | bf6c | bf74 | bf79 | bf7c | c105 | c107 | c10d | c117 | c11d |
| c125 | c127 | c137 | c13d | c147 | c157 | c167 | c17d | c1c2 | c1da | c1e2 | c1f2 | c1fa |
| c245 | c247 | c24b | c24d | c24f | c257 | c25d | c26e | c27a | c27e | c287 | c289 | c28b | c28d |
| c28e | c28f | c297 | c29b | c29d | c29e | c2a7 | c2ab | c2ae | c2af | c2b4 | c2b7 | c2be | c2c4 |
| c2c7 | c2cd | c2cf | c2d4 | c2d7 | c2d9 | c2e4 | c2e9 | c2f4 | c2f9 | c2fa | c2fd | c2fe | c34e |
| c354 | c35e | c362 | c364 | c36e | c372 | c374 | c37a | c37e | c388 | c389 | c38b | c38d | c38f |
| c39b | c39d | c3a9 | c3ab | c3af | c3b4 | c3b9 | c3c2 | c3c4 | c3c5 | c3ca | c3cd | c3d2 | c3d4 |
| c3d9 | c3da | c3e2 | c3e4 | c3e5 | c3e9 | c3f2 | c3f4 | c3f5 | c3f9 | c3fa | c3fd | c3fe | c645 |
| c647 | c64b | c64d | c657 | c65d | c662 | c664 | c66e | c672 | c674 | c67a | c67e | c685 | c687 |
| c689 | c68b | c68e | c697 | c69b | c69e | c6a7 | c6ab | c6ae | c6b4 | c6b7 | c6be | c6c4 | c6c5 |
| c6c7 | c6d4 | c6d7 | c6d9 | c6e2 | c6e4 | c6e5 | c6e9 | c6f2 | c6f4 | c6f5 | c6f9 | c6fa | c6fe |
| c754 | c762 | c764 | c772 | c774 | c77a | c785 | c789 | c78d | c79d | c7a9 | c7b9 | c947 | c957 |
| c967 | ca07 | ca0b | ca0d | ca17 | ca1b | ca1d | ca2e | ca3e | cac4 | cad4 | cae4 | caf4 | cafe |
| cb48 | cb4e | cb54 | cb58 | cb5e | cb64 | cb68 | cb6e | cb74 | cb78 | cb7a | cb7e | cb8d | cb8f |
| cb98 | eb9d | cba8 | cbaf | cbb4 | cbb8 | cbc4 | cbc8 | cbcd | cbd4 | cbd8 | cbda | cbe4 | cbeb |
| cbf4 | cbf8 | cbfa | cbfd | cbfe | cd07 | cd0f | cd17 | cd27 | cd2f | cd37 | cd47 | cd4f | cd57 |
| cd67 | cd6f | cdca | cdda | cdfa | ce05 | ce0b | ce0d | ce1b | ce1d | ce32 | ce34 | ce3a | ce85 |
| ce8b | ce9b | cea8 | ceab | ceb4 | ceb8 | cec4 | cec5 | cec8 | ced4 | ced8 | cee2 | cee4 | cee5 |
| cee8 | cef2 | cef4 | cef8 | cefa | cf54 | cf62 | cf64 | cf72 | cf74 | d147 | d167 | d205 | d207 |
| d20e | d217 | d21e | d227 | d22c | d22e | d237 | d23c | d23e | d2c7 | d2cf | d2d7 | d2e8 | d2ec |
| d2f8 | d2fc | d2fe | d305 | d307 | d30b | d30f | d317 | d325 | d327 | d32b | d32f | d335 | d337 |
| d33b | d385 | d38b | d38f | d398 | d3a8 | d3ab | d3ac | d3af | d3b8 | d3bc | d3c2 | d3c5 | d3c8 |
| d3d8 | d3dc | d3e2 | d3e5 | d3e8 | d3ec | d3f2 | d3f5 | d3f8 | d3fc | d3fe | d51c | d53c | d5d4 |
| d5dc | d5e4 | d5ec | d5f4 | d5fc | d602 | d607 | d60e | d617 | d619 | d61e | d627 | d62e | d634 |
| d637 | d63e | d647 | d648 | d654 | d657 | d658 | d662 | d668 | d66e | d674 | d678 | d67e | d719 |
| d7a9 | d7b9 | d907 | d917 | d927 | d947 | d957 | d967 | d9d2 | d9da | d9f2 | d9fa | da02 | da07 |
| da0e | da17 | da19 | da1e | da27 | da2c | da2e | da32 | da37 | da3c | da3e | da47 | da48 | da4c |
| da57 | da58 | da5c | da62 | da68 | da6c | da6e | da72 | da78 | da7c | da7e | db05 | db07 | db17 |
| db25 | db27 | db37 | db85 | db8f | db98 | dba8 | dbac | dbaf | dbb4 | dbb8 | dbb9 | dbbc | dbc2 |
| dbc5 | dbc8 | dbd4 | dbd8 | dbd9 | dbda | dbdc | dbe2 | dbe5 | dbe8 | dbec | dbf4 | dbf8 | dbf9 |
| dbfa | dbfc | dbfe | dd1c | dd2c | dd3c | dd54 | dd5c | dd64 | dd6c | dd74 | dd7c | de02 | de05 |
| de19 | de1a | de32 | de34 | de3a | de45 | de48 | de54 | de58 | de62 | de65 | de68 | de72 | de74 |
| de78 | de7a | de85 | dea8 | deac | deb4 | deb8 | debc | df19 | e105 | e10d | e11d | e125 | e13d |
| e14d | e15d | e17d | e182 | e19a | e1a2 | e1b2 | e1ba | e245 | e24b | e24d | e24f | e256 | e265 |
| e26f | e276 | e27a | e286 | e289 | e28b | e28d | e28f | e296 | e29b | e2a9 | e2ab | e2af | e2b4 |
| c2b9 | e2ca | e2cd | e2cf | e2d4 | e2da | e2e4 | e2e9 | e2f4 | e2f6 | e2f9 | e2fa | e2fd | e34b |
| e34f | e362 | e364 | e372 | e374 | e37a | e3d4 | e3e2 | e3e4 | e3f2 | e3f4 | e3f6 | e3fa | e605 |
| e60b | e60d | e614 | e61a | e625 | e62b | e62d | e632 | e634 | e63a | e685 | e68b | e698 | e69b |
| e6a8 | e6ab | e6b4 | e6b8 | e6c2 | e6c5 | e6ca | e6d2 | e6d4 | e6d8 | e6da | e6e4 | e6e5 | e6e8 |
| e6f2 | e6f4 | e6f5 | e6f8 | e6fa | e74b | e762 | e764 | e772 | e774 | e776 | e77a | ea02 | ea06 |
| ea09 | ea0b | ea16 | ea1b | ea1c | ea2b | ea2c | ea32 | ea3c | ea46 | ea4b | ea56 | ea58 | ea5c |
| ea68 | ea6c | ea72 | ea76 | ea78 | ea7c | ead4 | eadc | eae9 | eaf4 | eaf6 | eafc | eb09 | eb0f |
| eb32 | ebc8 | ebd4 | ebd8 | ebdc | ebe2 | ebe4 | ebe8 | ebec | ebf2 | ebf4 | ebf6 | ebfb | ebfc |
| ed0c | ed1c | ed2c | ed3c | ed4c | ed54 | ed5c | ed6c | ed74 | ed7c | ee02 | ee05 | ee06 | ee09 |
| ee14 | ee16 | ee1a | ee25 | ee32 | ee34 | ee3a | ee45 | ee46 | ee54 | ee56 | ee58 | ee64 | ee65 |
| ec68 | ee72 | ee74 | ee76 | ee78 | ee7a | ee85 | ee89 | ee96 | ce98 | eea9 | eeb4 | eeb8 | eebc |
| ef09 | ef26 | ef32 | f105 | f10d | f11d | f125 | f12d | f13d | f14d | f15d | f17d | f182 | f19a |
| f1a2 | f1b2 | f1ba | f205 | f20a | f21a | f225 | f235 | f23a | f286 | f28b | f298 | f29d | f2a6 |
| f2a8 | f2ab | f2b4 | f2b8 | f2c8 | f2ca | f2d4 | f2d8 | f2da | f2e8 | f2f4 | f2f8 | f2fa | f2fd |
| f34b | f354 | f358 | f372 | f374 | f378 | f37a | f50c | f51c | f52c | f53c | f584 | f594 | f5ac |
| f5b4 | f5bc | f602 | f605 | f60a | f614 | f61a | f625 | f634 | f635 | f63a | f645 | f648 | f654 |
| f658 | f662 | f665 | f668 | f674 | f675 | f678 | f67a | f685 | f698 | f6a8 | f6ac | f6b8 | f6bc |
| f705 | f716 | f71a | f732 | f73a | f905 | f90d | f91d | f925 | f92d | f935 | f93d | f94d | f95d |
| f97d | f982 | f98a | f99a | f9a2 | f9b2 | f9ba | fa02 | fa06 | fa0b | fa0c | fa16 | fa1c | fa26 |
| fa2b | fa2c | fa32 | fa3c | fa46 | fa48 | fa4b | fa56 | fa58 | fa5c | fa62 | fa68 | fa6c | fa72 |
| fa78 | fa7c | fad4 | fad9 | fadc | fae9 | faec | faf4 | faf9 | fafc | fb05 | fb1a | fb3a | fd0c |
| fd1c | fd2c | fd3c | fd4c | fd54 | fd5c | fd64 | fd6c | fd74 | fd7c | fd82 | fd84 | fd8a | fd94 |
| fd9a | fda2 | fdac | fdb2 | fdb4 | fdba | fdbc | fe02 | fe04 | fe0S | fe06 | fe0b | fe0d | fe14 |
| fe16 | fe1a | fe1d | fe25 | fe26 | fe2b | fe32 | fe34 | fe3a | fe3d | fe45 | fe46 | fe48 | fe4b |
| fe4d | fe54 | fe56 | fe58 | fe62 | fe65 | fe68 | fe72 | fe74 | fe78 | fe7a | fe7d | fe85 | fe86 |
| fe8b | fe96 | fe98 | fea6 | fea8 | fea9 | feab | feac | feb4 | feb8 | feb9 | febc | fec2 | fec5 |
| fec8 | fed4 | fed8 | fed9 | feda | fedc | fee2 | fee5 | fee8 | fee9 | feec | fef2 | fef4 | fef8 |
| fef9 | fefa | fefc | ff02 | ff06 | ff0b | ff2b | ff4b | ff54 | ff5c | ff6c | ff74 | ff7c | |

An exhaustive search of eight bit wide synchronization patterns was also conducted but none were found that could tolerate a six bit wide error burst. From this search it is believed that eight bit wide synchronization patterns can only tolerate a two bit wide error burst.

The set of 2127 sixteen bit patterns shown in Table 1 were then analyzed for their error propagation characteristics when they are decoded from the encoded flux changes on the disk to binary form by the disk drive read channel. Pursuant to this analysis, each of the synchronization patterns was encoded into (1,7) run-length-limited (RLL) codes. A disk media error was simulated and translated into the RLL pattern. As mentioned above, one disk media error can translate into one or more bits of error in the decoded binary synchronization pattern, depending upon the type and location of the media error.

The RLL patterns were decoded into binary form using the decoder disclosed in U.S. Pat. No. 4,413,251 to Adler et al. The resulting NRZ binary forms of the synchronization patterns were inspected to measure each pattern's error burst width. The inspection yielded three subsets of binary numbers that were derived from the original set of binary numbers listed in Table 1. The first subset contains 21 patterns that propagated up to a four bit wide error burst; the second subset contains 84 patterns that propagated up to a five bit wide error burst; and the third subset contains 1055 patterns that propagated up to a six bit wide error burst. The remaining patterns of the original 2127 patterns propagated error bursts that were more than six bits wide and were not used herein as synchronization patterns. Tables 2, 3, and 4 summarize these results. Any of the patterns listed in Tables 2, 3, and 4 can be used as synchronization patterns for the fault tolerant comparator 40.

TABLE 2

| Patterns that propagate up to 4 bits of error | | | | | | | | | | | | | | | | | | | | |
|---|---|---|---|---|---|---|---|---|---|---|---|---|---|---|---|---|---|---|---|---|
| 8e8b | 8e8c | 8ea9 | 8eab | a30f | a38b | a38f | a3a9 | a3ab | a8cb | a8eb | aa39 | ce32 | ce3a | ce8b | cea8 | ceab | de32 | de3a | dea8 | ea32 |

TABLE 3

| Patterns that propagate up to 5 bits of error |
|---|
| 83fd 8bf6 8e76 8e7a 8e85 8e89 8e9b 8e9c 8ed9 8edc 93fd 9e05 9e3b 9e85 9e8b 9e8c 9e9c 9ea8 9eab 9edc a337 a34f a379 a389 a38d a39b a39d a3fd a776 a78d a79d a9e6 aa76 aa78 aadc aade ab4f ab73 ab74 ab78 ab79 abf4 abf6 addc b73a b7a9 bf74 bf79 c3fd cbf4 cd05 ce34 ce85 ce9b ceb4 dbf4 de05 de34 de45 de72 de74 de78 de7a de85 deb4 e2fd e34f e372 e374 e37a e772 e774 e776 e77a ea72 ea76 ea78 eadc ebf4 ebf6 f705 f732 f73a ff74 |

TABLE 4

Patterns that propagate up to 6 bits of error

| | | | | | | | | | | | | | | | | |
|---|---|---|---|---|---|---|---|---|---|---|---|---|---|---|---|---|
| 80cb | 8143 | 8147 | 814b | 814d | 8153 | 8157 | 8185 | 818d | 818e | 81ae | 81c5 | 81cd | 81e5 | 8287 | 8289 | 8283 |
| 82ac | 82ad | 82af | 82b3 | 82b7 | 82bc | 82bd | 82fc | 818d | 81ae | 81c5 | 81cd | 81e5 | 8287 | 8289 | 8283 |

The present invention is also intended to include the method of comparing disk data to a synchronization pattern. Specifically, the method includes the steps of exclusive NORing the disk data with the synchronization pattern to form an exclusive NOR output pattern. The left boundary of the error burst, if any, in the exclusive NOR output pattern is located and a left boundary output pattern is generated. The exclusive NOR output pattern is realigned to the left by a number of bits equal to the maximum allowable error burst width. The realigned exclusive NOR output pattern is ORed with the left boundary output pattern to form an OR output pattern. All of the bits of the OR output pattern are then ANDed together to produce a fault_sync signal.

As mentioned above, several minor modifications may be made to the comparator 40. Many of these modifications involve the inversion of the inputs and outputs of the various logic gates. For example, referring back to FIG. 2, if the inverting outputs are removed from the multiplexer 46, then the inverter 45 will not be needed. Furthermore, it is envisioned that exclusive OR gates may be substituted for the exclusive NOR gates 42. In this scenario, the output xn [15:0] would be inverted from that described above so that ones would indicates errors and zeros would indicate matches. The left boundary of the error burst would be located by sequentially ORing the bits of the output xn [15:0] instead of ANDing. The exclusive OR output xn [15:0] would be realigned in basically the same manner as described above. However, the output of the left boundary circuit and the output of the multiplexer would be ANDed together instead of ORed, and the any ones in the output would indicate a mismatch. All of the bits in the output of the AND gates would be ORed together to detect ones, i.e., mismatches.

The fault tolerant comparator 40 and the synchronization patterns listed in the tables above provide a convenient way to establish synchronization between a disk drive controller and the disk data even when there are errors in the synchronization field of the disk data. Another way to provide the same function would be to use a truth table with thirty-two inputs, i.e., sixteen inputs for the disk data diskdat [15:0] and sixteen inputs for the synchronization pattern syncpat [15:0]. However, such a circuit would yield $2^{32}$ or 131,070 product terms of the AND/OR logic. The complexity, area, and speed of such a circuit are immense. The comparator 40 minimizes gate count which reduces the propagation delay of the compare function.

As mentioned above, the serializer/deserializer (serdes) block of the disk data controller 24 receives the serial binary disk data and converts it to parallel form. The manner in which the disk data is converted to parallel form is not critical to the present invention. For example, the serdes could be constructed to operate in two bit mode. In two bit mode there would be two serial data paths from the read channel, i.e., NRZIN1 and NRZIN0. A shift register sh [9:0] having two parallel inputs would receive the serial inputs NRZIN1 and NRZIN0. Each shift of the shift register will move two data bits across the shift register. Assuming, for illustration purposes only, that the synchronization pattern is eight bits wide, the shift register sh [9:0] can receive the synchronization pattern field of the disk data in the following two alternative manners:

| Even alignment: | | | | | |
| --- | --- | --- | --- | --- | --- |

| | sh[1] | sh[3] | sh[5] | sh[7] | sh[9] |
| --- | --- | --- | --- | --- | --- |
| NRZIN1 → | sb[1] | sb[3] | sb[5] | sb[7] | |
| NRZIN0 → | sb[0] | sb[2] | sb[4] | sb[6] | |
| | sh[0] | sh[2] | sh[4] | sh[6] | sh[8] |

| Odd alignment: | | | | | |
| --- | --- | --- | --- | --- | --- |
| | sh[1] | sh[3] | sh[5] | sh[7] | sh[9] |
| NRZIN1 → | sb[0] | sb[2] | sb[4] | sb[6] | |
| NRZIN0 → | d[7] | sb[1] | sb[3] | sb[5] | sb[7] |
| | sh[0] | sh[2] | sh[4] | sh[6] | sh[8] |

Where d [7] is the most significant bit of the first data byte.

Two comparisons are made between the synchronization pattern and the disk data during each clock period. One comparison uses bits sh [7:0] of the shift register, and the other comparison uses bits sh [8:1] of the shift register. Byte alignment can occur with either the even alignment or the odd alignment of the disk data sb [7:0] sitting in the two-bit shift register. The fault tolerant comparator establishes byte alignment upon the first successful compare and selects the correct eight bits off the shift register sh [9:0] to form the byte. Byte alignment can occur during the clock high half period or the low half period.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A comparator for comparing disk data to a synchronization pattern, comprising:

an exclusive OR stage for exclusive ORing the disk data with the synchronization pattern to form an exclusive OR output pattern;

a left boundary stage for locating a left boundary of an error burst in the exclusive OR output pattern and for generating a left boundary output pattern which indicates the position of the left boundary of the error burst;

a multiplexer for realigning the exclusive OR output pattern by a number of bits equal to a maximum allowable error burst width to form a multiplexer output pattern, the exclusive OR output pattern being realigned such that the least significant bits are shifted in a direction towards the most significant bits; and an error detection stage for determining if a right boundary of the error burst in the multiplexer output pattern has been realigned such that it is located to the left of the left boundary of the error burst as indicated by the left boundary output pattern.

2. A comparator according to claim 1, wherein the exclusive OR stage comprises a plurality of exclusive NOR gates.

3. A comparator according to claim 2, wherein the left boundary stage comprises a plurality of AND gates for sequentially ANDing the bits of the exclusive OR output pattern beginning with the most significant bit.

4. A comparator according to claim 1, wherein the multiplexer is a four-to-one multiplexer that can be programmed to realign the exclusive OR output pattern by a maximum allowable error burst width of four, five, or six bits.

5. A comparator according to claim 2, wherein the error detection stage comprises:
- a plurality of OR gates for ORing the left boundary output pattern with the multiplexer output pattern to form an OR gate output pattern; and
- an AND stage for ANDing together all of the bits of the OR gate output pattern.

6. A comparator according to claim 1, further comprising:
- an exact synchronization circuit for generating an exact sync output when the disk data exactly matches the synchronization pattern.

7. A comparator according to claim 6, wherein the exclusive OR stage comprises a plurality of exclusive NOR gates and the exact synchronization circuit comprises an AND stage for ANDing together all of the output bits of the plurality of the exclusive NOR gates.

8. A comparator according to claim 1, wherein the synchronization pattern is chosen from one of a plurality of subsets of binary numbers that are derived from an original set of binary numbers, each of the plurality of subsets of binary numbers being derived by encoding each of the numbers in the original set of binary numbers into (1,7) run-length-limited (RLL) codes, inserting a simulated disk media error into each of the RLL codes, and then decoding each of the RLL codes into non-return-to-zero (NRZ) binary numbers, wherein each subset of binary numbers includes the numbers in the original set of binary numbers which cause the respective NRZ binary numbers to have an error burst up to a predetermined number of bits wide, the predetermined number of bits being different for each different subset of binary numbers.

9. A comparator according to claim 8, wherein the plurality of subsets of binary numbers include first, second, and third subsets of binary numbers, and wherein:
- the first subset of binary numbers are the numbers in the original set of binary numbers which cause the respective NRZ binary numbers to have up to a four bit wide error burst;
- the second subset of binary numbers are the numbers in the original set of binary numbers which cause the respective NRZ binary numbers to have up to a five bit wide error burst; and
- the third subset of binary numbers are the numbers in the original set of binary numbers which cause the respective NRZ binary numbers to have up to a six bit wide error burst.

10. A comparator according to claim 9, wherein each of the numbers in the original set of binary numbers are sixteen bits wide and can withstand a six bit wide error burst.

11. A comparator for comparing disk data to a synchronization pattern, comprising:
- a plurality of exclusive NOR gates for exclusive NORing the disk data with the synchronization pattern to form an exclusive NOR output pattern;
- a left boundary stage for locating a left boundary of an error burst in the exclusive NOR output pattern and for generating a left boundary output pattern which indicates the position of the left boundary of the error burst;
- a multiplexer for realigning the exclusive NOR output pattern by a number of bits equal to a maximum allowable error burst width to form a multiplexer output pattern, the exclusive NOR output pattern being realigned such that the least significant bits are shifted in a direction towards the most significant bits;
- a plurality of OR gates for ORing the left boundary output pattern with the multiplexer output pattern to form an OR gate output pattern; and
- an AND stage for ANDing together all of the bits of the OR gate output pattern.

12. A comparator according to claim 11, wherein the left boundary stage comprises a plurality of AND gates for sequentially ANDing the bits of the exclusive NOR output pattern beginning with the most significant bit.

13. A comparator according to claim 11, wherein the multiplexer is a four-to-one multiplexer that can be programmed to realign the exclusive NOR output pattern by a maximum allowable error burst width of four, five, or six bits.

14. A comparator according to claim 11, further comprising:
- an exact synchronization circuit for generating an exact sync output when the disk data exactly matches the synchronization pattern.

15. A comparator according to claim 14, wherein the exact synchronization circuit comprises an AND stage for ANDing together all of the bits of the exclusive NOR output pattern.

16. A comparator according to claim 11, wherein the synchronization pattern is chosen from one of a plurality of subsets of binary numbers that are derived from an original set of binary numbers, each of the plurality of subsets of binary numbers being derived by encoding each of the numbers in the original set of binary numbers into (1,7) run-length-limited (RLL) codes, inserting a simulated disk media error into each of the RLL codes, and then decoding each of the RLL codes into non-return-to-zero (NRZ) binary numbers, wherein each subset of binary numbers includes the numbers in the original set of binary numbers which cause the respective NRZ binary numbers to have an error burst up to a predetermined number of bits wide, the predetermined number of bits being different for each different subset of binary numbers.

17. A comparator according to claim 16, wherein the plurality of subsets of binary numbers include first, second, and third subsets of binary numbers, and wherein:
- the first subset of binary numbers are the numbers in the original set of binary numbers which cause the respective NRZ binary numbers to have up to a four bit wide error burst;
- the second subset of binary numbers are the numbers in the original set of binary numbers which cause the respective NRZ binary numbers to have up to a five bit wide error burst; and
- the third subset of binary numbers are the numbers in the original set of binary numbers which cause the respective NRZ binary numbers to have up to a six bit wide error burst.

18. A comparator according to claim 17, wherein each of the numbers in the original set of binary numbers are sixteen bits wide and can withstand a six bit wide error burst.

19. A method of comparing disk data to a synchronization pattern, comprising the steps of:
- exclusive NORing the disk data with the synchronization pattern to form an exclusive NOR output pattern;
- locating a left boundary of an error burst in the exclusive NOR output pattern and generating a left boundary output pattern which indicates the position of the left boundary of the error burst;

realigning the exclusive NOR output pattern by a number of bits equal to a maximum allowable error burst width to form a realigned exclusive NOR output pattern, the exclusive NOR output pattern being realigned such that the least significant bits are shifted in a direction towards the most significant bits;

ORing the left boundary output pattern with the realigned exclusive NOR output pattern to form an OR output pattern; and ANDing together all of the bits of the OR output pattern.

20. A method according to claim 19, wherein the locating step comprises the step of sequentially ANDing the bits of the exclusive NOR output pattern beginning with the most significant bit.

21. A method according to claim 19, wherein the maximum allowable error burst width in the realigning step is four, five, or six bits.

22. A method according to claim 19, further comprising the step of generating an exact sync output when the disk data exactly matches the synchronization pattern.

23. A method according to claim 22, wherein the generating step comprises the step of ANDing together all of the bits of the exclusive NOR output pattern.

24. A comparator according to claim 19, wherein the synchronization pattern is chosen from one of a plurality of subsets of binary numbers that are derived from an original set of binary numbers, each of the plurality of subsets of binary numbers being derived by encoding each of the numbers in the original set of binary numbers into (1,7) run-length-limited (RLL) codes, inserting a simulated disk media error into each of the RLL codes, and then decoding each of the RLL codes into non-return-to-zero (NRZ) binary numbers, wherein each subset of binary numbers includes the numbers in the original set of binary numbers which cause the respective NRZ binary numbers to have an error burst up to a predetermined number of bits wide, the predetermined number of bits being different for each different subset of binary numbers.

25. A comparator according to claim 24, wherein the plurality of subsets of binary numbers include first, second, and third subsets of binary numbers, and wherein:

the first subset of binary numbers are the numbers in the original set of binary numbers which cause the respective NRZ binary numbers to have up to a four bit wide error burst;

the second subset of binary numbers are the numbers in the original set of binary numbers which cause the respective NRZ binary numbers to have up to a five bit wide error burst; and the third subset of binary numbers are the numbers in the original set of binary numbers which cause the respective NRZ binary numbers to have up to a six bit wide error burst.

26. A comparator according to claim 25, wherein each of the numbers in the original set of binary numbers are sixteen bits wide and can withstand a six bit wide error burst.

* * * * *